US006977966B1

(12) United States Patent
Zuhdi et al.

(10) Patent No.: US 6,977,966 B1
(45) Date of Patent: *Dec. 20, 2005

(54) BIDIRECTIONAL OPTICAL COMMUNICATIONS HAVING QUICK DATA RECOVERY WITHOUT FIRST ESTABLISHING TIMING AND PHASE LOCK

(75) Inventors: Muneer Zuhdi, Lewisville, TX (US); George H. Buabbud, South Lake, TX (US)

(73) Assignee: Tellabs Bedford, Inc., Bedford, TX (US)

( * ) Notice: Subject to any disclaimer, the term of this patent is extended or adjusted under 35 U.S.C. 154(b) by 917 days.

This patent is subject to a terminal disclaimer.

(21) Appl. No.: 09/723,804

(22) Filed: Nov. 28, 2000

(51) Int. Cl.[7] .............................................. H04L 27/10
(52) U.S. Cl. ...................... 375/282; 375/361; 375/359; 398/41; 398/154; 398/191; 398/183
(58) Field of Search ................................. 375/361, 359, 375/282; 398/41, 191, 154, 183

(56) References Cited

U.S. PATENT DOCUMENTS 5,459,607 A * 10/1995 Fellows et al. ............. 398/154
5,969,839 A * 10/1999 Yoshida et al. ............. 398/191
6,370,212 B1 * 4/2002 Nakai ......................... 375/359
6,487,264 B1 * 11/2002 Alley et al. ................. 375/361
6,567,199 B1 * 5/2003 Nakaoka et al. ............ 398/183
6,731,873 B1 * 5/2004 Zuhdi et al. .................. 398/41

OTHER PUBLICATIONS

Muoi, Van T., "Receiver Design for Digital Fiber Optic Transmission Systems Using Manchester (Biphase) Coding", IEEE Transactions on Communications, vol. Com.-31. No. 5, May 1983, pp. 608-619.
Braddeley, D., "Indentification Cards-Contactless Integrated Circuit(s) Cards-Proximity Cards-Part 2: Radio Frequency Power and Signal Interface", ISO/IEC 14443-2, Mar. 26, 1999, pp.1-15.

* cited by examiner

Primary Examiner—Stephen Chin
Assistant Examiner—Sudhanshu C. Pathak
(74) Attorney, Agent, or Firm—Baker Botts L.L.P.

(57) ABSTRACT

A method of transmitting and rapidly recovering a burst of data without first having to establish a timing or phase lock. The signals are transmitted as modified Manchester coded signals having pulse transitions at a clocking pulse rate which is a multiple of the clocking pulse rate at which the signals are originally generated, and wherein the MOOSE coded signal is modified by ON-OFF keying.

13 Claims, 10 Drawing Sheets

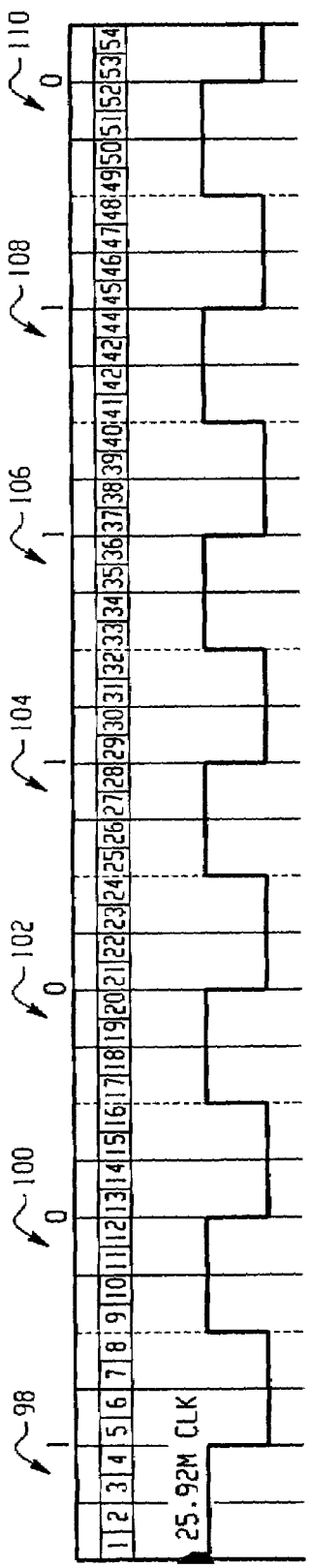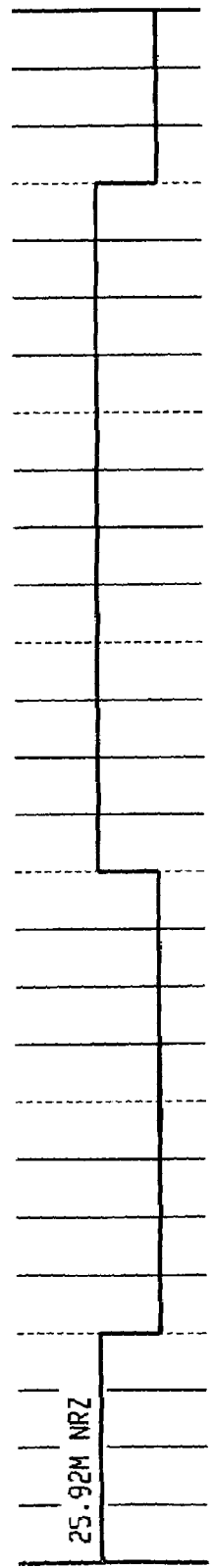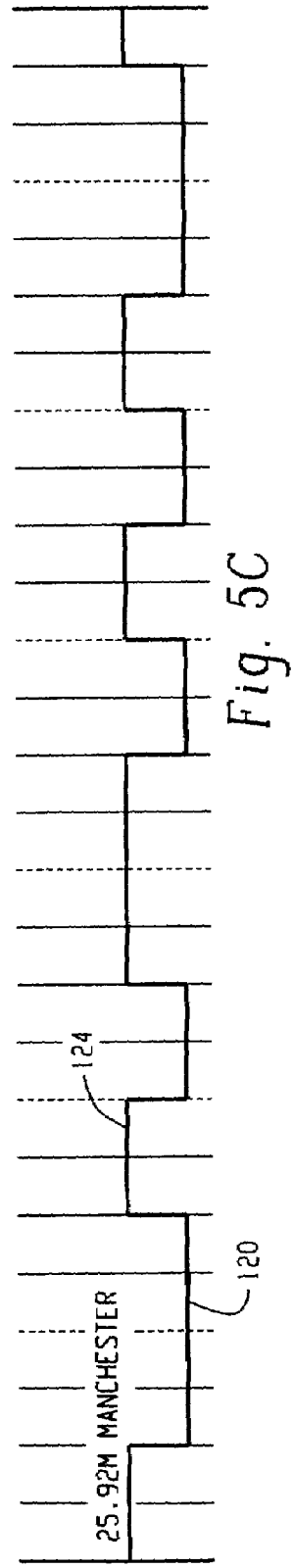

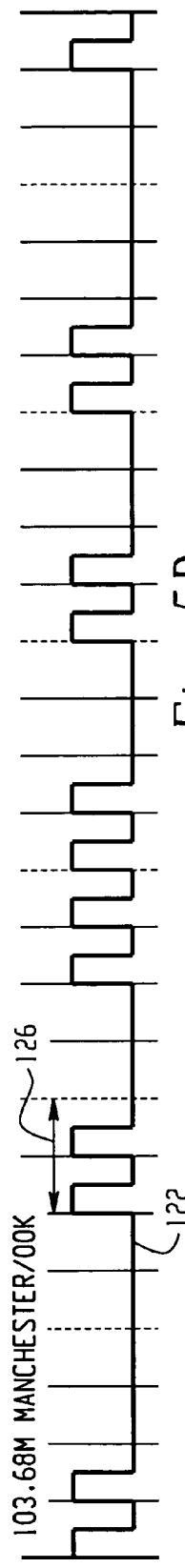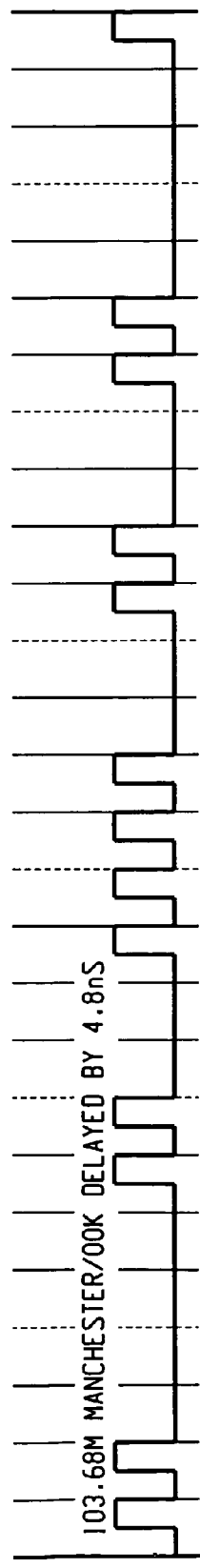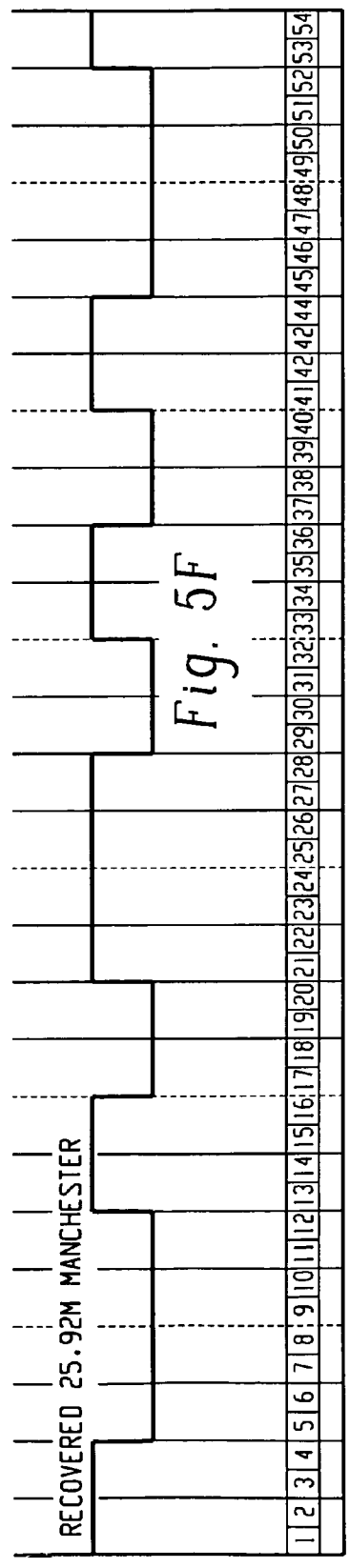

BIDIRECTIONAL OPTICAL COMMUNICATIONS HAVING QUICK DATA RECOVERY WITHOUT FIRST ESTABLISHING TIMING AND PHASE LOCK

BACKGROUND OF THE INVENTION

1. Field of the Invention

The present invention relates generally to methods and apparatus for providing FTTH (Fiber to the Home) bidirectional communications over a single optical fiber, and more specifically to NRZ (Non-Return to Zero) coded signals at a first frequency transmitted downstream and a Manchester coded signal at a second frequency modified by ON-OFF keying and transmitted upstream. The upstream and downstream coded signals are both used to modulate a carrier light wave having a selected wavelength of light, such as, for example, 1310 nanometers of light. The invention further relates to methods and apparatus for transmitting and recovering bursts of data with a minimal number of preamble bits and without first requiring phase lock.

2. Description of Related Art Including Information Disclosed Under 37 C.F.R 1.97 and 1.98

The communications industry is using more and more optical or light fibers in lieu of copper wire. Optical fibers have an extremely high bandwidth thereby allowing significantly more information than can be carried by a copper wire transmission line such as twisted pairs or coaxial cable.

Of course, modern telephone systems require bidirectional communications where each station or user on a communication channel can both transmit and receive. This is true, of course, whether using electrical wiring or optical fibers as the transmission medium. Early telephone communication systems solved this need by simply providing separate copper wires for carrying the communications in each direction, and this approach is still exclusively used in many locations and as part of the transmission path in many others. It is used to a greater degree as the signals get closer to the home or business end users. Although twisted pairs and coaxial cables are more likely to be used in distribution terminals close to the end user and homes, some modern telecommunication systems now use microwave and end-to-end optic fibers as the transmission mediums. In addition, various techniques are often used in optical transmission so that a signal optical fiber can carry more communication in both directions.

However, because of extremely high bandwidths available for use by an optical fiber, a single fiber is quite capable of carrying a great number of communications in both directions. One technique of optical transmission is WDM (Wavelength Divisional Multiplexing) which uses different wavelengths for different types of transmissions. Typical examples are the use of 1550 nanometers of light for TV signals transmission and 1310 nanometers of light for bidirectional telephony transmission.

It is noted that the term telephony is used rather than telephone to underscore the fact that communication transmission will include vocal telephone use but is not so limited. Typical telephony systems operate at a single frequency or wavelength of light which is divided into upstream and downstream carefully synchronized time windows for transmitting bursts of data. The use of such upstream and downstream synchronized windows is referred to as TDM (Time Division Multiplexing). This type of telephony systems use a single optical fiber and often may use only a single diode, for both converting electrical signals to optical signals and converting received optical signals to electrical signals.

However, as mentioned above, optical fibers have extremely high bandwidths and use of an optical fiber as a single bidirectional telephone channel is a very ineffective use of the fiber and, in fact, the available bandwidth of an optical fiber is what makes it possible to use two different and unrelated transmission techniques such as the transmission of bidirectional TDM telephone techniques at one wavelength, and the use of another technique, such as straightforward broadcasting of TV signals downstream at a second wavelength. Typically, two wavelengths regardless of the two techniques being used are combined by the use of WDM technology.

A major problem for the bidirectional telephony signals is light reflection typically occurring at optical connections or interfaces along the optical fiber, and in a worse case situation, the reflected energy may be interpreted as an actual signal transmission in the bidirectional communication. In addition, the typical use of NRZ (Non-return To Zero) coding and the need for increasing data transmission efficiency by using a minimum number of preamble bits are at odds with each other. Furthermore, clocking pulses and initial pulses of a transmitted signal are typically recovered by establishing a PLL (phase lock loop) by evaluating the time period between high to low and low to high transitions. Thus, since a consecutive string of "1"s or "0"s, using NRZ coding may result in the absence of any transition for an excessive period of time, the effect may be a shift in the timing of a data frame or "wander." Therefore, a simple and straightforward technique to solve these problems would be of great value.

Therefore, a technique for transmitting bidirectional telephony signal bursts having minimal energy overlap, occurring from reflection and fast clocking recovery would allow the use of readily available hardware and make efficient and effective use of an optical fiber.

SUMMARY OF THE INVENTION

Shortcomings of the above-discussed bidirectional communication system are overcome by the apparatus and methods of the present invention which comprises generating a first NRZ (Non-Return to Zero) data stream having a first clocking frequency and then transmitting the first NRZ data stream by an optical fiber from a first location to a second location. The data stream is transmitted by modulating a carrier having a selected wavelength of light such as, for example, 1310 nanometers. The selected wavelength of light from the first location is received at the second location and the NRZ data stream is recovered. A second NRZ data stream intended for travel to the first location and also having the first clocking frequency is converted to a Manchester coded data stream at the first clocking frequency. The Manchester coded data stream frequency is then further modified by ON-OFF keying at a second frequency which is a selected multiple of the first clocking frequency, such as, for example, eight times (8×) the first clocking frequency. A particular combination coding discloses as a preferred embodiment herein as MOOSE (Manchester OOK Serial Encoding). The modified combination coded data stream or MOOSE coded data stream generated at the second location is transmitted to the first location by the same optical fiber used by the first NRZ coded data stream and at the same selected wavelength of light. The modified MOOSE coded data stream is then received at the first location where it is converted back to an NRZ data stream having the first clocking frequency without having to first determine clocking signals or establish phase lock loop by reconstructing the Manchester code. The reconstruction is accomplished by delaying the combination coded data stream for a period of time substantially equal to one-half cycle of the second frequency and then combining the delayed signal with an undelayed stream of the combination coded signal.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which:

FIG. 5A shows a stream of clocking pulses at about 25 MHZ;

FIG. 5B shows an example of an NRZ (non-return to zero) data stream also at approximately 25 MHZ and having a series of data bits 1, 0, 0, 1, 1, 1 and 0;

FIG. 5C shows the same series of data bits of FIG. 5B using Manchester coding at about 25 MHZ;

FIG. 5D shows the same series of data bits of FIG. 5B using Manchester coding modified by ON-OFF keying or "MOOSE" coding at approximately 100 MHZ;

FIG. 5E shows the same series of data bits of FIG. 5D with a selected delay of about 4.8 nano seconds;

FIG. 5F shows the result of combining the signals FIGS. 5D and 5E with an OR gate element. FIG. 5F is substantially the same as FIG. 5C.

DETAILED DESCRIPTION OF THE PREFERRED EMBODIMENT(S)

Figure 1:
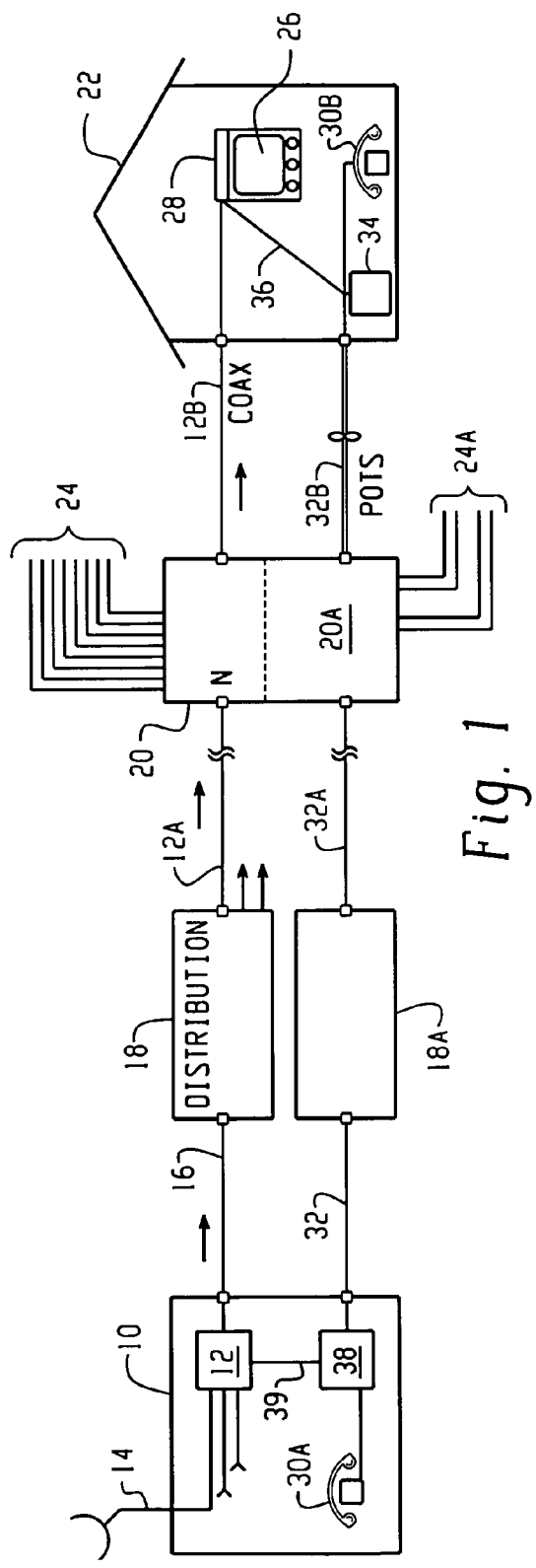
FIG. 1 is a prior art block diagram showing transmission and distribution of a typical coaxial TV and POTS telephone system.

Referring now to FIG. 1, there is shown a typical transmission and distribution system for cable TV and normal telephone service, referred to as POTS (plain old telephone service). As shown, cable TV source location 10 has cable TV transmission equipment 12 which may originate from several sources including a satellite receiver 14. The TV equipment 12 would then amplify this signal and send it out typically on a coaxial line, such as line 16, to a distribution system which may include several terminals, such as terminal 18, where the signal is again amplified and further distributed to an even larger multiplicity of locations. It is possible, of course, that there is no further amplification or distribution, or alternately, such re-amplification and further distribution may occur several times. In any event, the signal will eventually arrive at a local distribution terminal 20 by means of a coaxial cable 12a from which it is then distributed to a home or building 22 by a coaxial cable 12b. As shown, distribution terminal 20 may also provide TV signals to other buildings or homes, such as indicated by bracket 24. Once the TV signal is received at building 22, it will then typically be provided to a TV set 26 directly or to a set-top or cable TV box 28. If the signal is first provided to the set-top box 28, it is then directly provided to TV set 26. It should be appreciated that the direction of travel for such signals may be totally or primarily unidirectional and downstream. That is, it travels primarily from the cable TV signal source 10 to the set-top box 28 in the building or home 22 at frequencies within a frequency band of between 55–870 MHZ, and which TV channels have frequencies of between 55–870 MHZ.

Also shown is a typical telephone system or POTS which, of course, is two-way communication typically carried by means of a twisted pair of wires. In the example shown in FIG. 1, if someone at the cable TV signal source location 10 wishes to talk with someone at building 22, the telephone 30a is used in its normal manner. After substantial switching and routing, the two-way conversation is carried on between the person in building 10 using telephone 30a and by a person using telephone 30b in the home or building 22. This communication is typically carried through a twisted pair of wires such as indicated by 32, 32a, and 32b. In recent years, the regular telephone distribution system has also been used to provide communications between computers. This is done by the use of a modem 34 which connects a computer to the telephone line. As was the case with the TV signal distribution, there are typically several stations or substations such as substation 18a between the two telephones 30a and 30b located at the building 10 and the building 22, respectively. Such distribution terminals or stations allow telephone services between all subscribers with which we are all well aware. However, as shown in portion 20a of distribution terminal 20, there may also be several other buildings or homes connected to telephone distribution terminal 20 as indicated by bracket 24a. As was discussed earlier, communications between buildings 10 and 22 were typically accomplished through regular telephone service by individuals talking to each other. However, with more efficient automation, telephone lines may also be connected up to the set-top box 28 as indicated by wires 36. In addition, in the distribution terminal 38 at the cable TV signal location, there is also a telephone connection 39 to the TV signal equipment 12, such that it is now possible that a request to purchase movies or information concerning the TV signals and TV equipment can be communicated between the two locations without human intervention.

Figure 2:
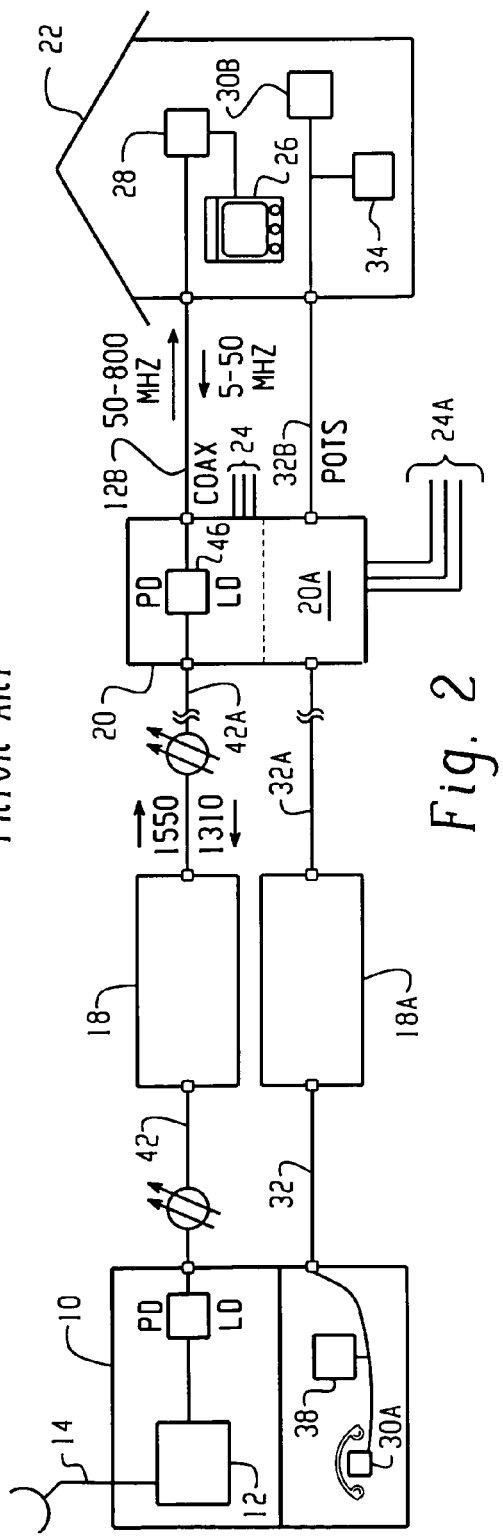
FIG. 2 shows a prior art POTS telephone system and a fiber optic TV distribution system having 1550 nanometer light carrying TV signals in one direction and 1310 nanometers of light carrying telephony signals in both directions.

As demands increase for more and more TV channels and better and more efficient transmission techniques without disruption and interference, the long runs of coaxial cable are simply becoming inefficient and inadequate. Thus, as is shown in FIG. 2, there is an improved system for the transmission of TV signals between the TV signal source location 10 and the building or home 22. In the systems shown in FIG. 2, there is also shown a standard telephone or POTS system as discussed above.

In the improved television transmission system, however, the transmission is achieved by a fiber optical cable as indicated by fiber optical cables 42 and 42a. As shown in FIG. 2, the same coaxial cable 12b exists between the distribution terminal 20 and the home or building 22. However, also as shown, distribution terminal 20 includes new equipment 46 which receives the light transmitted on fiber optic 42 and converts it to electrical signals and conversely receives electrical signals from 12b and converts the electrical signals to light signals for transmission on fiber optic 42a. However, as will be appreciated by those skilled in the art, the TV signals from the TV signal source building 10 normally travel downstream only and are continuous. Thus, it is seen that it is possible by the use of a single fiber optic cable, as well as using existing infrastructure copper wiring such as coaxial cable, to transmit a continuous broad frequency band of TV signals carrying multiple channels of TV information at one wavelength of light. The individual TV channels are then converted to electrical signals at a specific frequency within a selected frequency band, such as, for example, only the 55–870 MHZ frequency band.

Figure 3:
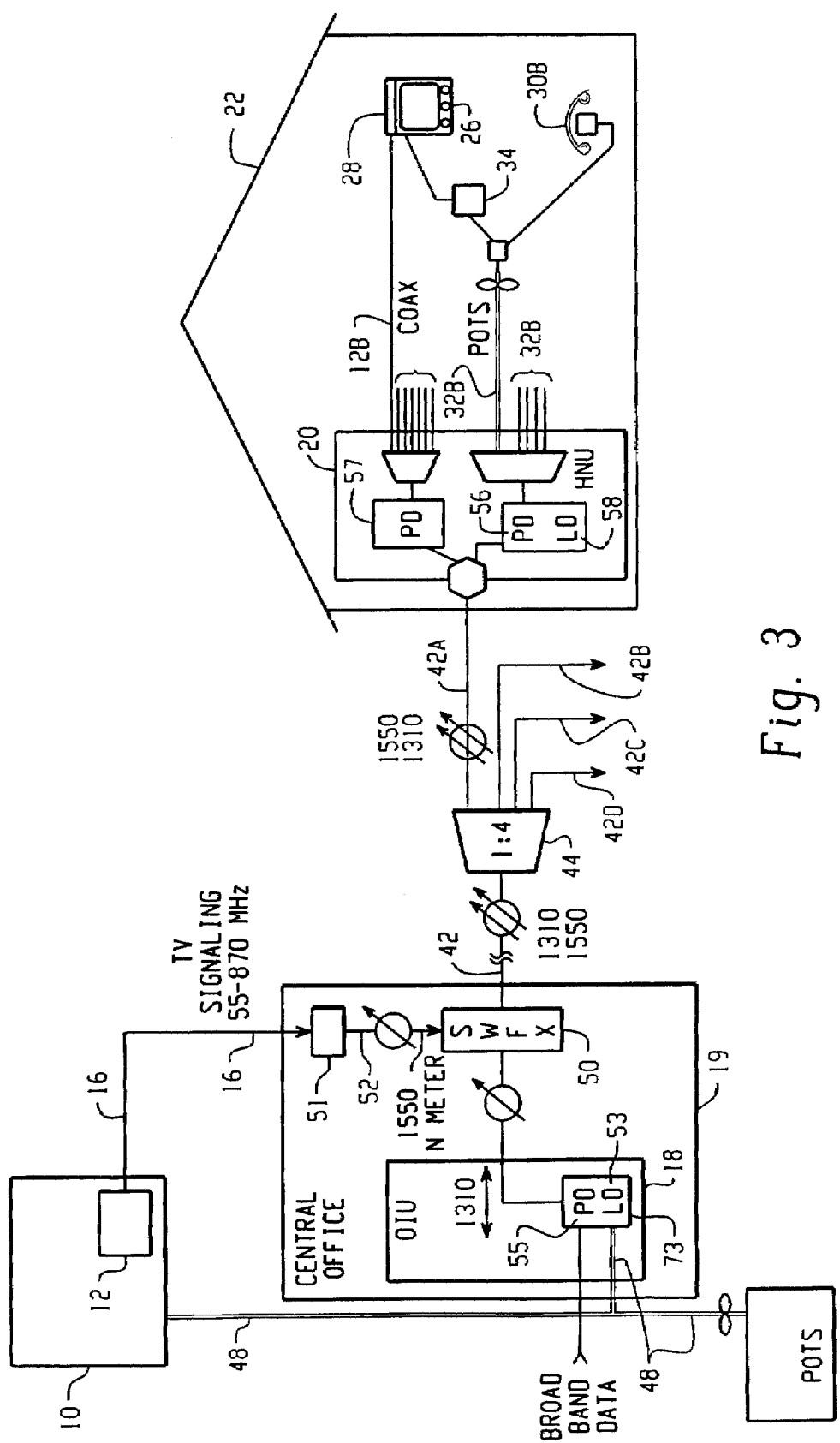
FIG. 3 shows a block diagram of a FTTH (Fiber to the Home) communication system using the present invention and a single optical fiber for carrying the TDM telephony signals in both directions at 1310 nanometers.

Referring now to FIG. 3 there is shown a simplified block diagram of the operation of one embodiment of the FTTH (Fiber to the Home) present invention, illustrated as using a single series of optical fibers 42 and 42a for the bidirectional telephone transmission between the Optical Interface Unit or OIC 18 located at Central Office 19 and the building or home 22. It should be noted that, although the following discussion is in terms of a single series of optical fiber cables 42 and 42a between the Central Office 19 and Home 22, there may also be one or more amplification stations located at various locations in the distribution path.

Further, as is shown, in addition to the series of optical fibers 42 and 42A traveling between OIU (Optical Interface Unit) 18 at Central Office 19 and a distribution terminal 20, hereinafter referred to as the HNU (Home Network Unit), there will be other optical fibers as indicated by optical fibers 42b through 42d which extend between one-to-four Optical Splitter/Coupler 44 and other home distribution terminals or HNU's similar to HNU 20. Each of the optical fibers 42b through 42d may carry light at both 1550 nanometers and 1310 nanometers.

As shown, TV signal source location 10 provides signals from equipment 12 and, in this illustrated embodiment, the TV signals may be 55–870 MHZ signals provided to a coupler or WDM (Wave Division Multiplexer) 50. It will be appreciated that cable 16 could be either an optical fiber or a coaxial cable. A copper coaxial cable 16 would carry the TV signals having a bandwidth of 55–870 MHZ to circuitry 51 which uses the electrical TV signals to modulate light having a selected wavelength which is directed or focused onto optical fiber 52. In one preferred embodiment, a particular selected wavelength for such TV signals is 1550 nanometers. Thus, the 1550 nanometer light waves are provided to optical fiber 42 by WDM 50, and according to one embodiment, travel in a single direction from WDM 50 through optical fibers 42 and 42a to distribution terminal or HNU 20 in house or building 22, of course, once the 1550 nanometer light carrying the TV signal arrives at HNU 20, photo-diode or PD 57 strips out the TV signals such that they can be distributed throughout home or building 22, as shown by coaxial cable 12b carrying the signals to set up top box 28 and/or television 26.

Also as shown, electrical telephony or POTS (Plain 01e Telephone) signals may be carried to Central Office 19 by copper wires, such as copper wires 48, which represent a twisted pair of normal telephone communication wires. Circuitry or OIU 18 in Central Office 19 receives these electrical telephony signals as well as other broadband data signals traveling downstream. As will be discussed in detail later with respect to FIG. 4, Circuitry 18 generates a coded form of these data signals to modulate light at a selected wavelength (typically by a laser diode—(LD) 53). In the same manner, light at that same wavelength traveling upstream and also previously modulated by electrical telephony signals is detected (typically by a photo detector—(PD) 55) and processed to recover the telephony signals. Thus, the fiber optic cables 42 and 42a shown between OIU 18 and home or destination 22 carries telephony signals at a single wavelength of light typically selected to be about 1310 nanometers, fibers 42a through 42d, there will be a plurality of additional optical fibers 54a through 54c also carrying many other telephony signals at 1310 nanometers.

Thus, ONU 18 which is connected to fiber optic cable 42 (through SWX 50) for carrying the 1310 modulated light may also receive 55–870 MHZ TV signals from the TV signal source location 10. The 55–870 MHZ electrical signals may, as an example, be used to modulate light having a wavelength of 1550 nanometers. SWX (Splitter with Division Multiplexing) 54 then combines by WDM (Wave Division Multiplexing) the plurality of 1310 nanometer wavelength signals along with the 1550 nanometer wavelength signals such that cables 42 and 42a carrying the TV signals in a downstream direction on 1550 nanometer light and carries bidirectional telephony signals in both directions at 1310 nanometers of light. Of course, fiber optical cables 42b through 42d and connected to coupler/splitter 44 carry the 1550 nanometer light and the 1310 nanometer light in a similar manner.

At the downstream destination, the bidirectional telephony signals traveling on 1310 nanometer light waves are routed to equipment in HNU 20 in Home 22 which recovers the electrical telephony signals by a photo detector—(PD) 56 from the 1310 nanometer light waves traveling downstream and uses the electrical telephony signals traveling upstream to modulate light waves having a wavelength of 1310 nanometers by laser diode—(LD) 58. The electrical telephony signals are then distributed from HNU box 20 by wire pair 32b to the telephone 30b or other telephony equipment such as the 56K telephone modem 34 at home or building 22.

As was discussed above, the extremely broad bandwidth available with the use of optical fibers as a transmission medium offers many advantages and vastly increases subscriber density on a single fiber. Unfortunately, new uses and demands continue to grow at ever-increasing rates. Consequently, what may have appeared to be an overabundance of bandwidth for years to come a couple of years ago is already or threatens to become crowded in the near future. In addition, every technology has its own special set of problems and the use of optical fiber as a transmission medium for telephony communication is no exception. More particularly, using present techniques, a light wave traveling through a fiber is particularly vulnerable to reflection if the connector joining the two fibers is dirty or improperly fitted. The present invention, however, discloses transmission techniques, coding, or protocols to minimize the effects of reflective overlap of the transmitted energy spectrum, and rapid clocking recovery.

Figure 4:
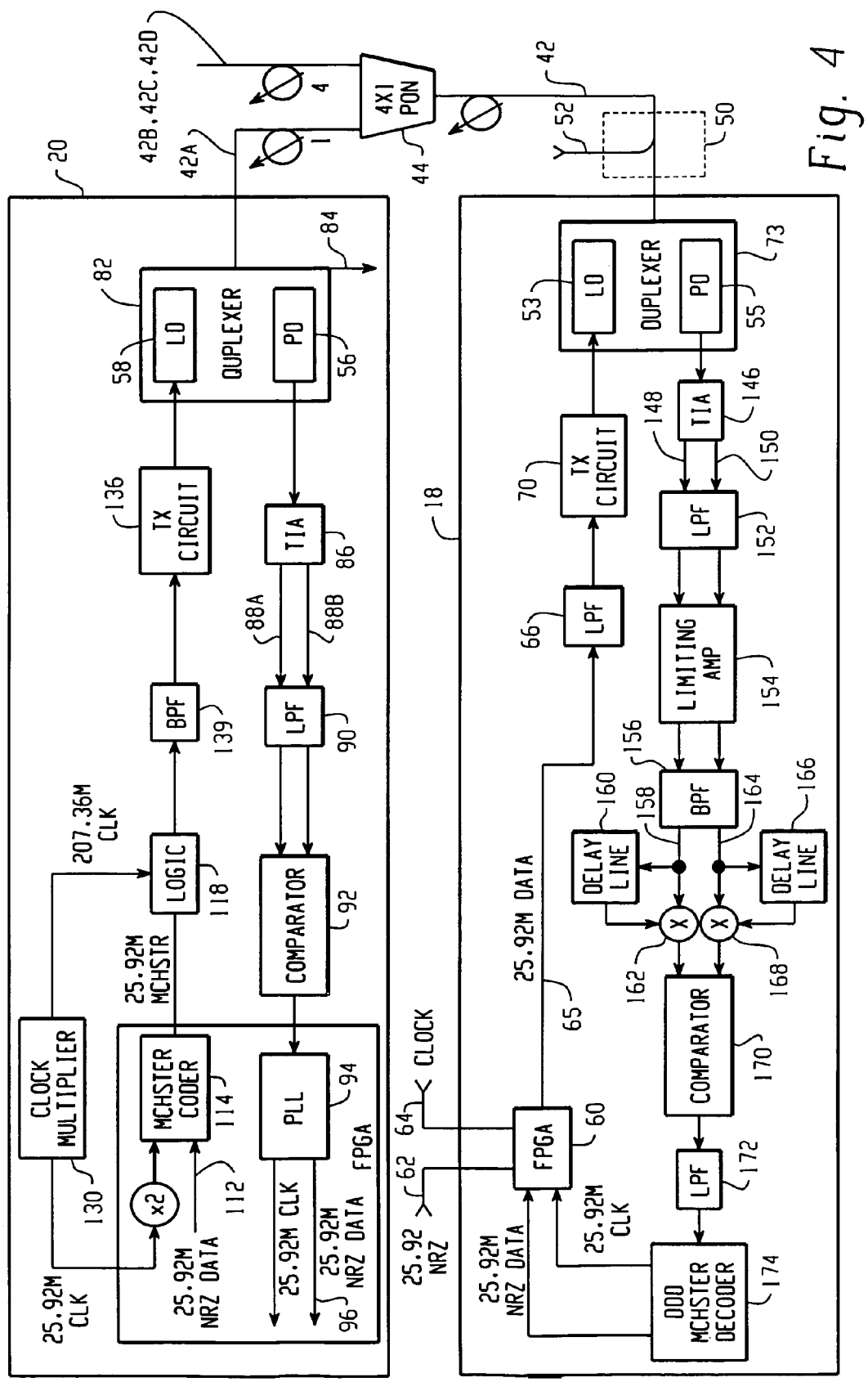
FIG. 4 shows a block diagram of the apparatus and data flow of the present invention.

Referring now to FIG. 4, there is shown a block diagram illustrating the features of the present invention. It should be noted that elements of FIG. 4, which are common with the elements of FIG. 3, may carry the same reference numbers. To aid in understanding the invention, the following embodiment of the invention is described assuming a two-way communication exchange extending at least between OIU 18 at a first location or Central Office 19 and a second location or HNU 20 in Home 22.

Figure 6A:
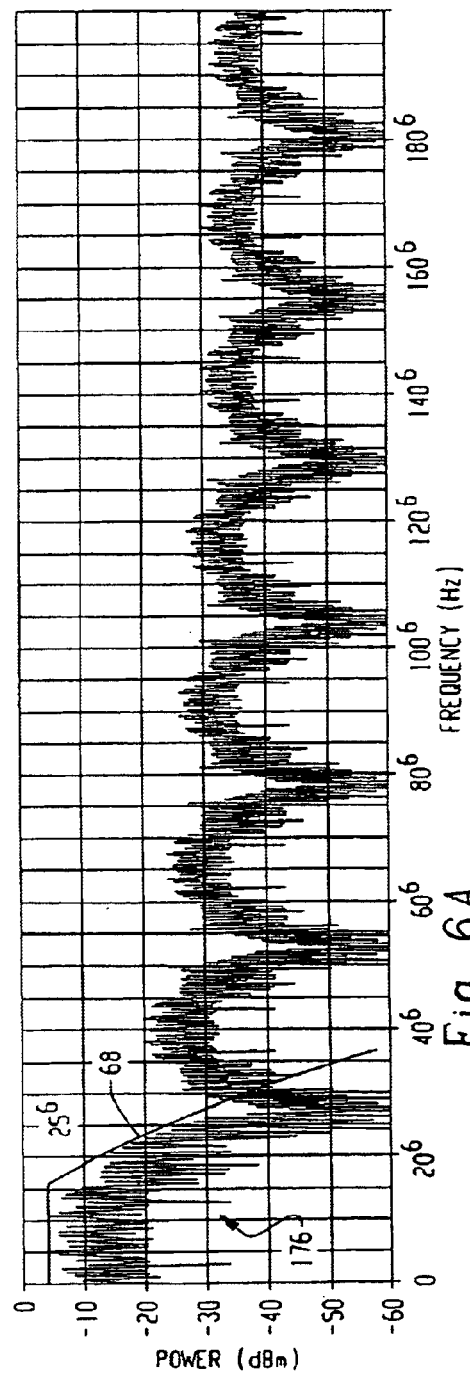
FIGS. 6A and 6B show the resulting power spectrum of the downstream and upstream signals, respectively, as a function of frequency.

According to the described embodiment, a first data stream of electrical pulses in NRZ (Non-Return to Zero) format and clocking signal having a selected frequency are received through the back plane by FPGA (Field Programmable Gate Array) 60 for conditioning at inputs 62 and 64, respectively. Control and synchronizing information along with addresses and alarm data is added to the data stream by FPGA 60. The stream of conditioned NRZ coded signals are then transmitted by line 65 to a low pass filter 66 located in OIU 18 at Central Office 19. In a preferred embodiment, the NRZ electrical pulses have a frequency of around 25 MHZ. More specifically, using standard and readily-available components and parts, this frequency will actually be about 25.92 MHZ. Low pass filter 66 will typically be chosen so as to readily pass frequencies less than about 25 MHZ, while substantially blocking all frequencies above about 30 MHZ. Referring briefly to FIG. 6A, and, as will be discussed in more detail later, line 68 represents the attenuation vs. frequency of low pass filter 66. As shown, LPF 66 substantially allows all frequencies to the left of line 68 to pass, while substantially attenuating everything to the right of line 68. The 25 MHZ NRZ data stream is then provided to laser driver 70 which adjusts or regulates the signal to provide for diode bias, power output of the diode and modulation level. The properly adjusted and regulated signal is then provided to laser diode (LD) 53 in duplexer 73 for modulating light waves having a nominal wavelength of about 1310 nanometers. This modulated light at 1310 nanometers is injected or focused directly onto optical fiber 42, or alternatively, as shown in dashed lines, the modulated light may first be provided to a WDM (Wave Division Multiplexer) 50 which combines the modulated 1310 nanometer light with another light frequency (such as 1550 nanometer) from optical fiber 52.

The 1310 nanometer light carrying the NRZ data stream on fiber 42 is then provided through a splitter such as 1×4 splitter 44 to optical cable 42a and then to the distribution panel 20 in home or building 22. Splitter 44 also provides individual fiber optical cables 42b, 42c and 42d to other homes or buildings which also receive the data stream. Cable 42a is then provided to a Quplexer 82 located in distribution panel 20, which separates out the 1550 nanometer light carrying the TV signals, if any, as shown at 84, and passes the 1310 nanometer light modulated by the NRZ coded data stream to photo diode 56. Photo diode 56 in Quplexer 82 along with the very low noise amplifier recovery circuit 86 recovers the 25 MHZ NRZ coded data stream adds gain and converts this data stream to a differential voltage output on a pair of electrical conductors 88a and 88b. The two different voltage outputs are provided to low pass filter 90 and then onto Comparator or Quantizer 92.

Comparator 92 uses the two signals on line 88a and 88b to regenerate the 25 MHZ NRZ data stream by improving the signal and increasing the signal-to-noise ratio such that the output of Comparator or Quantizer 92 is suitable for use by TLL Logic. This output of Quantizer 92 is then provided to PLL (Phase Lock Loop Circuit) 94 to recover the 25.92 NRZ data as well as the 25.92 clocking pulses. The 25 MHZ NRZ data is then provided by line 96 to receiving equipment.

The transmission path from the HNU 20 in the second location or Home 22 to OIU 18 at the Central Office 19 in earlier optical transmission systems might well have been a mirror image of the transmission sequence from OIU 18 to HNU 20 as discussed above. However, to assure efficiency and transmission integrity, the present invention uses a first NRZ coded transmission protocol to carry information in one direction at a first frequency of 25.92 MHZ as just discussed, and a modified Manchester coded transmission protocol at a second frequency to carry information in the opposite direction. The modified MOOSE coded data is referred to herein as Manchester/OOK coded data and provides transitions which are eight times (8×) the first frequency.

Referring now to FIGS. 5A through 5F, there is shown a first clocking signal of approximately 25 MHZ (actually 25.92 MHZ) at FIG. 5A and an NRZ digital data stream at FIG. 5B having bits 98 through 110 which represent binary bits 1, 0, 0, 1, 1, 1 and 0, respectively. FIG. 5C shows a typical Manchester coded data stream representing the same data stream of "1"s and "0"s as shown in the NRZ code of FIG. 5B. That is, FIG. 5B shows the NRZ code and FIG. 5C shows the Manchester code for the data sequence 1, 0, 0, 1, 1, 1, 0. As is recognized by those skilled in the art, one advantage of Manchester code over NRZ coding is that there are twice as many signal transitions or leading and trailing edges as present in an NRZ stream of data. In fact, when an NRZ data stream has a string of consecutive "1"s or "zeros," there are no transitions at all during such a consecutive stream.

Referring again to FIG. 4 and FIG. 5, the modified Manchester code protocol for data transmission from HNU 20 to in Home 22 to OIU 18 at Central Office 19 according to this invention will be discussed. As shown, in FIG. 4 and FIGS. 5B and 5C, an NRZ data stream (FIG. 5B) is provided along an electrical conductor 112 to circuitry 114 which converts the NRZ coded data stream on line 112 to an equivalent standard Manchester coded data stream on line 116 (FIG. 5C), also at 25.92 MHz. As discussed above, there are no signal transitions during the stream of connector "1"s represented by bits 104, 106 and 108 for the NRZ data stream of FIG. 5B. However, each of the Manchester coded data bits 104, 106 and 108 shown in FIG. 5C have two transitions. It will be appreciated that coding circuitry 114 could simply convert the 25 MHz NRZ data stream to a 25 MHz Manchester coded data stream as shown in FIGS. 5A and 5B and then transmit this 25.92 MHz Manchester coded signal to OIU 18 for information traveling from HNU 20 to OIU 18 with improved performance. It is noted that converting a 25.92 MHz NRZ coded signal to a 25.92 MHz Manchester coded signal requires a clocking signal which is twice the original 25.92 MHz clock. However, even significantly greater improved performance can be achieved by first converting the data stream traveling from HNU 20 to OIU 18 to a modified Manchester coded data stream which includes transitions at a frequency which is a multiple of the frequency of a 25.92 MHz Manchester coded data stream.

Referring again to FIG. 5C, there is shown the Manchester coded data stream which is the equivalent of the original 25 MHz NRZ data stream of FIG. 5D. FIG. 5D is a combination Manchester code passed through an ON-OFF Keying code device 118 and will be referred to herein as MOOSE coded signal according to the teachings of this invention. The ON-OFF coding device 118 receives the Manchester code and simply provides a reference voltage level such as a zero or "off" output for those portions of the Manchester coded bit that are already at zero and a repetitive switching between on-off, "one"--"zero," or "first level"--"second level" output for those portions of the Manchester coded bit that are "on" or equal to "1." For example, the first half 120 of bit 100 of FIG. 5C, is zero volts, so according to one embodiment, the first half 122 of bit 100 of the Manchester/OOK coded signal shown in FIG. 5D is also zero. However, the second half 124 of bit 100 of FIG. 5C is a "1," and therefore the repetitive ON-OFF keying by device 118 results in the second half 128 of bit 100 which is shown in FIG. 5D as a series of on-off pulses. It should be understood that the reference voltage could be selected by a "1" rather than a "zero" such that the high or "one" portion of the bit results in a continuous "1" and the "zero," or low portion of the bit could be switched between the reference "high" voltage and a second voltage which is, for example, "zero." Likewise, it is possible to set the reference voltage for a voltage level different than the voltage level of the portion of the bit it represents. The rate of the on-off cycle depends on the clocking signal as determined by clock multiplier 130 on line 132 to ON-OFF keying device 118. In the embodiment shown, clock multiplier 130 increases the 25.92 MHZ input clocking rate eight times (8×) to 207.36 MHz. Consequently, the ON-OFF portions of the Manchester/OOK coded data of FIG. 5D has a frequency four times (4×) that of the NRZ data of FIG. 5B. More specifically, for every NRZ coded bit (98 through 110) shown in FIG. 5B, there is a Manchester coded bit in FIG. 5C with at least two voltage level transitions. However, there are a minimum of four transitions as shown in FIG. 5D for the 103.68 MHz Manchester/OOK coded signals. The increased number of leading edge and trailing edge transitions of the data stream of FIG. 5D helps to assure data integrity, and, as will be discussed later, provides greater isolation or separation of the signal power spectrum and allows a fast clock recovery without first having to obtain a data lock by a phase lock loop.

Figure 6B:
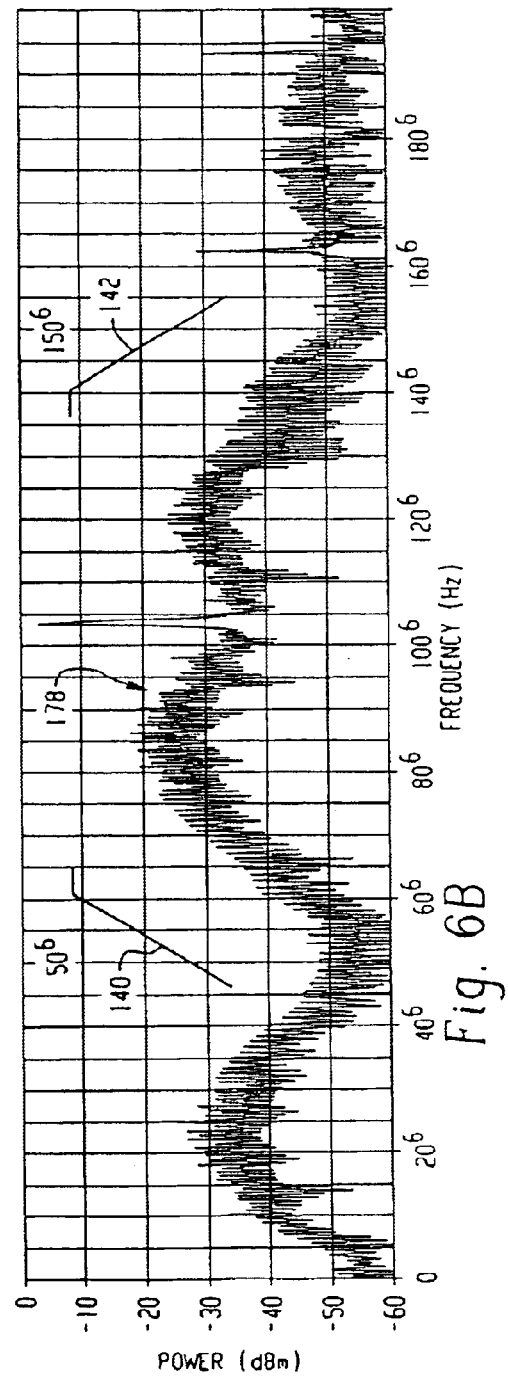

The unique Manchester ON-OFF Keying or MOOSE coded data signal is then provided from ON-OFF keying device 118 to BPF 134, TX driver circuit 136 and then to diode 58 in Quplexer 82 where it is used to modulate light directed onto optical fiber 80 for transmission to distribution terminal 18. Referring to FIG. 6B line 140 between about 50 and 60 MHz and line 142 between about 150 and 160 MHz shows the pass-no pass threshold of Band Pass filter 134. That is, only the signals which occur between line 140 and 142 can pass through the filter 134 to diode 58 to modulate the 1310 nanometer light. The 1310 nanometer light modulated by the MOOSE coded data stream is then provided to photo diode PD55 and TIA or Transimpedance Amplifier 146 such that the MOOSE coded electrical signal data is recovered as a pair of voltage differential signals on lines 148 and 150. A transimpedance amplifier is a low noise amplifier which converts current to voltage. Low Pass Filter 152 operates on the MOOSE coded signal in the same manner as discussed above with respect to the NRZ signal traveling from OIU 18 to HNU 20. However, unlike the processing of the NRZ data stream discussed above, the two outputs of low pass filter 152 are provided to a Limiting Amplifier 154. Limiting amplifier 154 amplifies each of the signal excursions as necessary to obtain an output signal where all of the "peak" values are at a predetermined level even if the "peak" values provided by Low Pass Filter 152 varied significantly. The two differential voltage outputs of Limiting Amplifier 154 are then provided to another Band Pass Filter 156 to again remove any noise or signals outside of the 50 MHZ to 160 MHz frequency band.

The output 158 is split and applied to delay line 160 and multiplier 162. Similarly, the reference output 164 is split and applied to delay line 166 and multiplier 168. According to the present embodiment, delay lines 160 and 166 provide a delay of approximately 4.8 nano seconds as shown in FIG. 6E.

Referring now to FIG. 6D, there is shown an idealized version of the recovered MOOSE code on line 158 prior to being applied to combining circuit 162. FIG. 6E shows an idealized version of the MOOSE code after being delayed for 4.8 nano seconds as would be present on line 146 and prior to being applied to combining circuit 168. FIG. 5F shows the output of combining circuit 168 after combining the data streams of FIGS. 5D and 5E. It will be appreciated that FIG. 5F is the same as the Manchester coded data stream of FIG. 5C, and thus the original upstream signal has been recovered without first establishing the timing clock signals or a phase lock. After further conditioning by Comparator 170 and Low Pass Filter 172, the Manchester coded data stream at 25.92 MHz will again be suitable for use by TTL circuitry. The 25.92 MHZ Manchester coded output of Low Pass Filter 172 is then provided to Manchester decoder 174 to recover the transmitted clock and to convert the Manchester coded data stream back to an NRZ data stream which is the original form of the data. The clocking signal and the recovered NRZ data stream are then provided to FPGA 60 for further routing of the signals through the back plane.

Referring now to FIGS. 6A and 6B, there is shown the power spectrum of the downstream and the upstream signal transmissions, respectively, according to the teachings of the invention. Referring to FIG. 6A, there is also shown the threshold line 68 of the low pass filter circuitry 90 shown in FIG. 4. As can be seen, the low pass filter 90 is chosen to readily pass all frequencies less than about 20 MHZ and to substantially attenuate frequencies (for example, 40–50 db of attenuation) above about 30 MHZ. Thus, as shown in FIG. 6A, the single burst 176 of NRZ data to the left of line 68 and which is about 25 MHz and less along with harmonics and other noise is transmitted and received at the downstream distribution terminal 20. However, after being passed through LPF 90, all of the higher frequency signals to the right of line 68 are heavily attenuated and will not be passed to Comparator 92.

In a similar manner, the data transmitted and received upstream at terminal 18 is passed through a band pass filter 156 which readily passes frequencies of between about 50 MHz and 150 MHz while substantially attenuating frequencies having a frequency of less than about 50 MHz and greater than about 150 MHz. The threshold (pass-no pass) lines 140 and 142 thus clearly illustrate how the upstream transmitted data is limited to the center burst of data 178 between 50 MHz and 150 MHz.

Figure 7A:
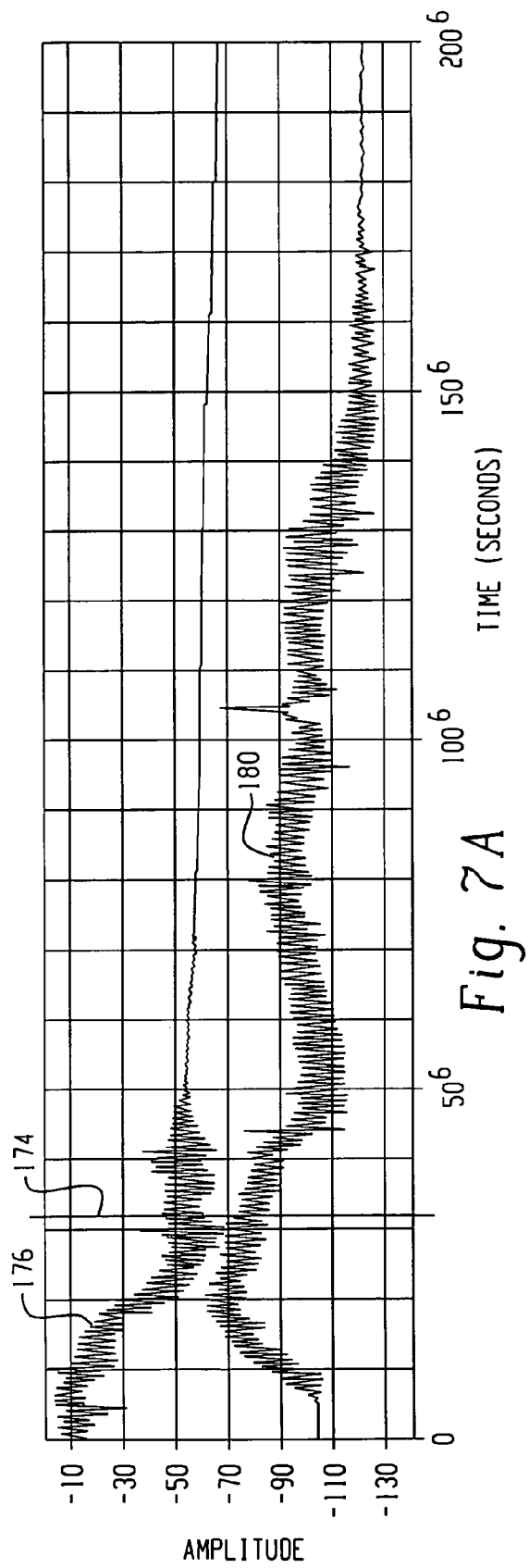
FIG. 7A shows an overlay of the downstream power spectrum and a 14 dB upstream reflection power spectrum as a function of frequency.

FIG. 7A shows the overlay of the signal 176 transmitted downstream and received at terminal 20 after it has passed the low pass filter 90. Curve 180 shows the power spectrum of a "reflected" signal (intended for transmission from terminal 20 to terminal 18) due to a bad optical connection or other anomaly in the optical line. Since all of the downstream data is carried by a burst of data of about 25 MHz and since the frequency above about 25 MHz are substantially attenuate, the only portion of the reflected transmission that can cause cross-talk or noise is that portion of curve 180 to the left of line 182 which is less than 25 MHz.

Figure 7B:
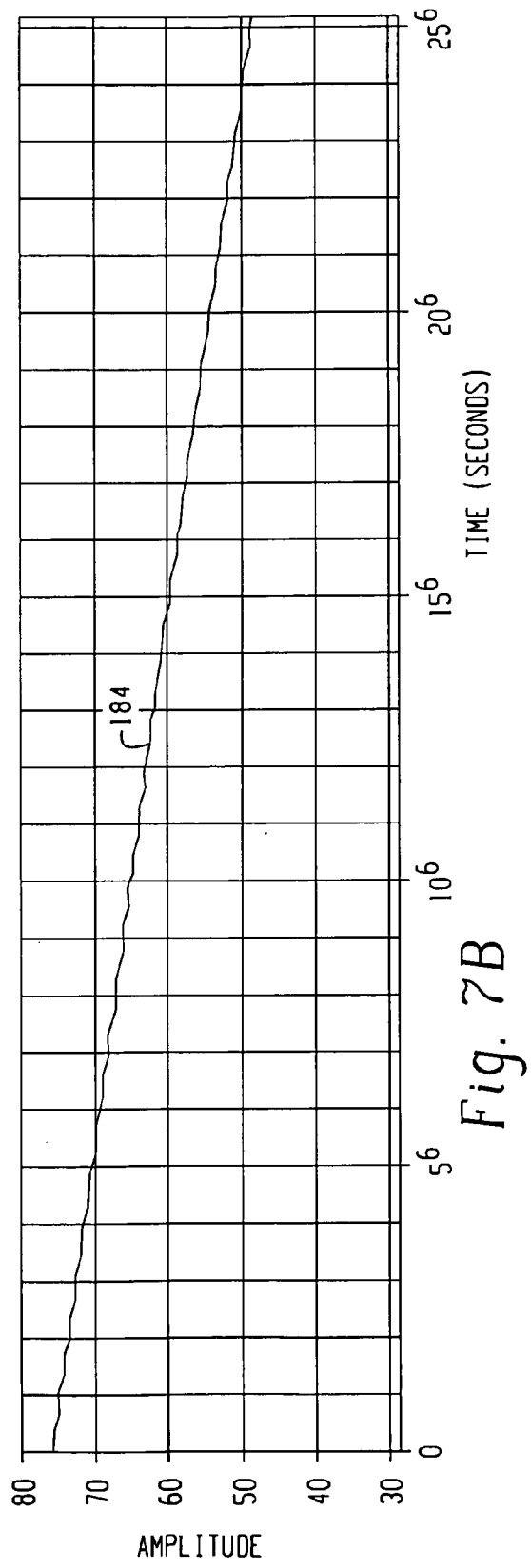
FIG. 7B shows the resulting isolation of the two power spectrums of FIG. 7A as a function of frequency.

Referring now to FIG. 7B, the portions of the power spectrum of FIG. 7A between 0 and 25 MHz is expanded and line 184 illustrates that the isolation between the actual signal and the reflected signal is between 75 dB and a worse case of 50 dB which is still excellent.

Figure 8A:
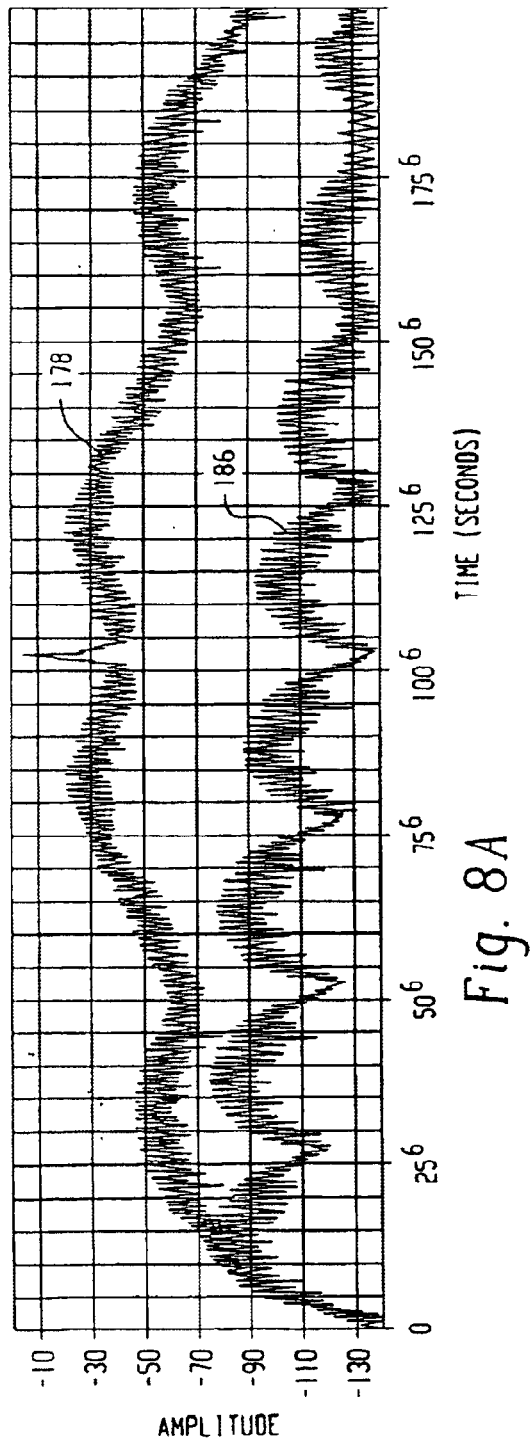
FIG. 8A shows an overlay of the upstream power spectrum and a 14 dB downstream reflection power spectrum as a function of frequency.
Figure 8B:
FIG. 8B shows the resulting isolation of the two power spectrums of FIG. 8A as a function of frequency.

Similarly, FIG. 8A shows an overlay of the signal 178 transmitted upstream and received at terminal 18 after it has passed through band pass filter 156. Curve 186 shows the power spectrum of a reflected signal originally intended for transmission downstream from terminal 18 to terminal 20. Since all of the data is carried by a power burst at frequencies between about 50 MHz and about 150 MHz and, since all of the frequencies outside of this band are substantially attenuated, the only portion of the reflected transmission that can cause noise and/or create cross-talk are those portions of curve 186 which is between 50 and 150 MHz. Therefore, the curve or line 188 of FIG. 8B expands the frequency band between about 50 MHz and 150 MHz and illustrates the isolation between the transmitted signal 178 and the reflected signal 186. As shown, the isolation is still very substantial. As shown, it varies from a worse case of about 35 dB up to about 75 dB.

Figure 9A:
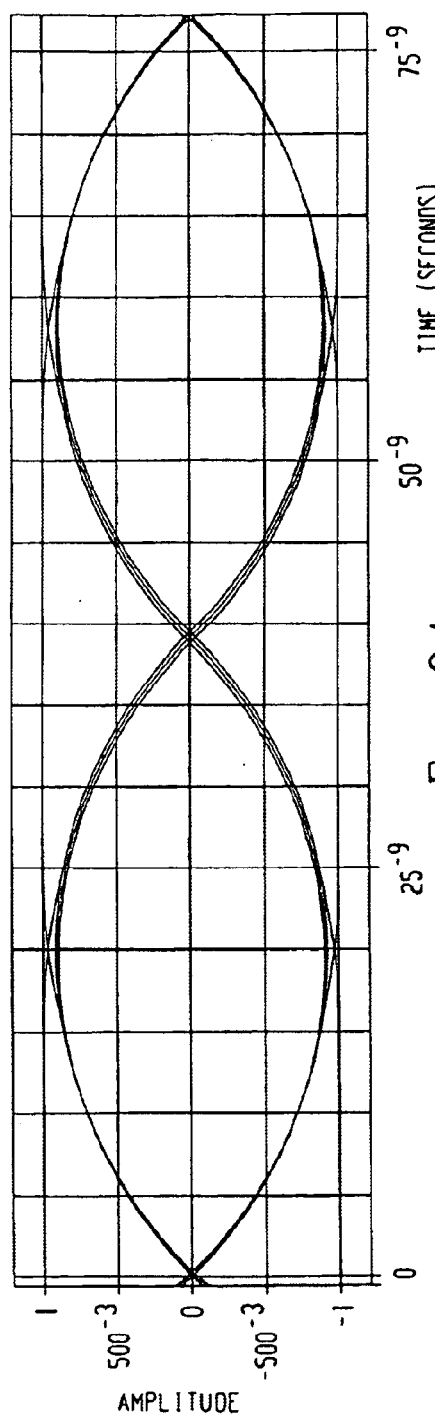
FIGS. 9A and 9B show the recovered "eye" pattern of the received 25 MHZ signal and the received 100 MHZ signal, respectively, with no reflection or attenuation.
Figure 9B:
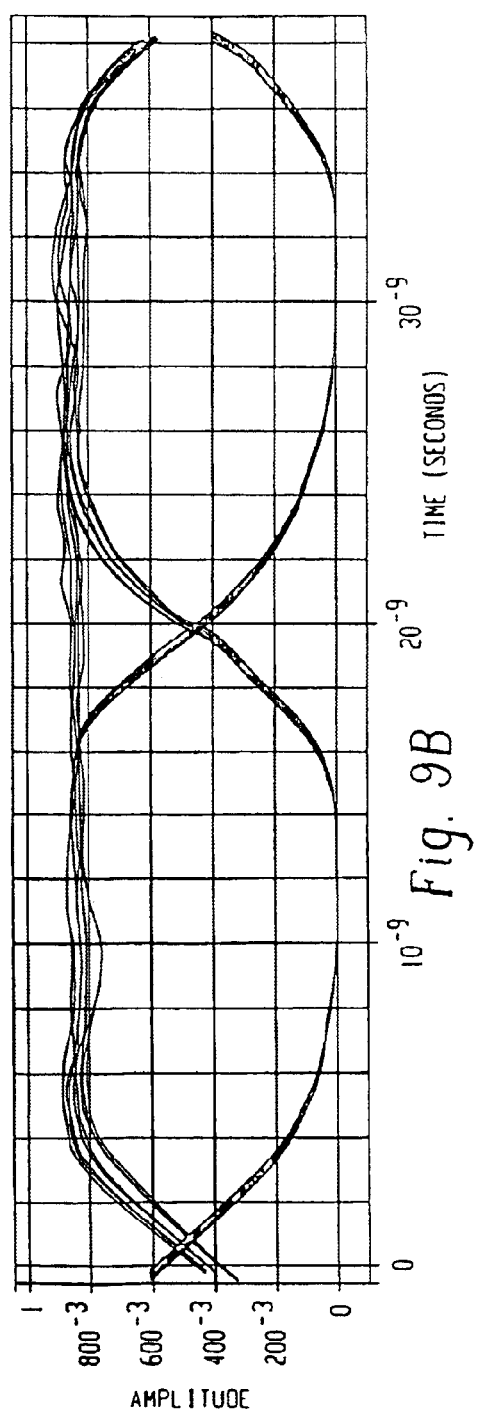

Referring now to FIGS. 9A and 9B, there is shown the "eye" pattern for the recovered upstream and downstream signals with a good, clean signal and no reflection. It will be appreciated by those skilled in the art, what is meant by the "eye" pattern is the volume level separation between the digital high and low or "1"s and "0"s signals. As shown, there is a substantial separation of the received 25 MHz downstream signal and the received 100 MHz upstream signal.

Figure 10A:
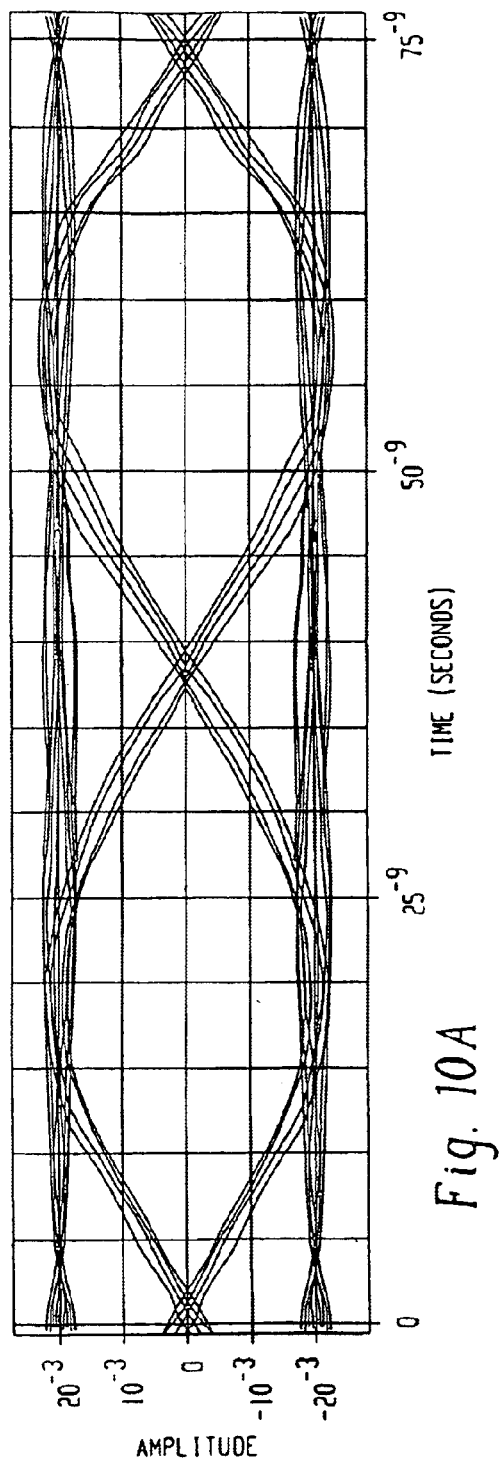
FIGS. 10A and 10B show the recovered "eye" pattern of the received 25 MHZ signal and the received 100 MHZ, respectively, in the presence of 14 dB reflection and 17 dB attenuation.
Figure 10B:
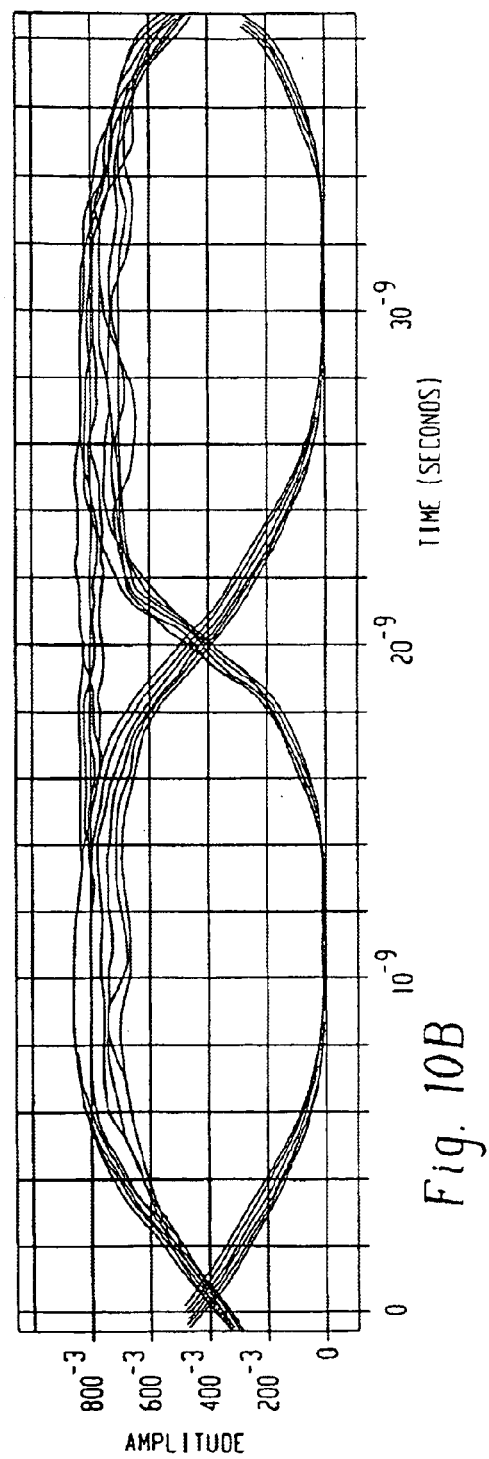

FIGS. 10A and 10B show the eye patterns for the same upstream and downstream signals when they are also subjected to a 14 dB reflected signal and a 17 dB attenuation. As shown, the "eye" patterns are still very distinct, although the amplitude separation of the 25 MHz received signal is reduced as is the amplitude separation for the 100 MHz.

The corresponding structures, materials, acts, and equivalents of all means or step plus function elements in the claims below are intended to include any structure, material, or act for performing the function in combination with other claimed elements as specifically claimed.

We claim:

1. A method of transmitting and recovering a stream of coded data bits without establishing a timing or phase lock, comprising the steps of:
    generating a stream of data bits at a selected frequency, each bit of said stream of data bits having one portion at a first voltage level and another portion at a second voltage level;
    generating a stream of clocking pulses at a second frequency, which second frequency is a multiple of said selected frequency;
    coding said stream of data bits by
        setting said one portion of each bit to a reference voltage level;
        continuously switching said another portion of each bit between said reference voltage level and another voltage level different than said reference voltage level at said second frequency;
    transmitting said coded data stream from a first location to another location;
    receiving said coded data stream and providing said coded data stream to a delay circuit and a combining circuit;
    delaying said coded data stream at said delay circuitry for a period of time substantially equal to one-half cycle of said second clocking frequency and providing said delayed coded data stream to said combining circuit; and
    combining said coded data stream and said delayed coded data stream to recover said stream of data bits at said selected frequency.

2. The method of claim 1 wherein said generated stream of data bits is a Manchester coded data stream.

3. The method of claim 2 wherein said second frequency is eight (8×) times said selected frequency.

4. The method of claim 1 wherein said step of generating a stream of data bits comprises the steps of:
    providing a stream of NRZ coded data bits; and
    converting said stream of NRZ coded data bits to a Manchester coded stream of data bits.

5. The method of claim 4 wherein said stream of NRZ coded data bits are provided at a rate of 25.92 MHz.

6. The method of claim 1 and further comprising the steps of passing said recovered stream of data bits through a filter to smooth out irregularities in said data bits resulting from said delay period not being equal to exactly one-half cycle of said second frequency.

7. The method of claim 1 wherein said transmitting step comprises the steps of:
    modulating a selected wavelength of light with said coded data stream; and
    transmitting said modulated light through an optical fiber between said first location and said another location.

8. The method of claim 7 wherein said selected wavelength of light is approximately 1310 nanometers.

9. The method of claim 7 wherein data is also transmitted from said another location to said first location.

10. In a data transmission system wherein a stream of data bits having a selected frequency and a first portion at one voltage level and a second portion at a second voltage level is modified for transmission between a first location and another location by setting said first portion of said data bits to a reference voltage level and continuously switching said second portion between said reference voltage level and another voltage level different than said reference voltage level at a second clocking frequency which is a multiple of said selected frequency, a method of recovering said stream of data bits without establishing timing or phase lock comprising the steps of:
    receiving said modified stream of data bits and providing said modified stream to a delay circuit and a combining circuit;
    delaying said modified stream of data bits of said delay circuit for a period of time substantially equal to one-half cycle of said second clocking frequency and providing said delayed modified stream of data bits to said combining circuit; and
    combining said modified stream of data bits and said delayed modified stream of data bits to recover said stream of data bits having said selected frequency.

11. The method of claim 10 when said stream of data bits having a selected frequency are Manchester coded data bits.

12. The method of claim 11 wherein said second frequency is eight (8×) times said selected frequency.

13. The method of claim 11 and further comprising the step of passing said recovered stream of data bits through a filter to smooth out irregularities in said recovered data bits resulting from said delay period not being equal to exactly one-half cycle of said second frequency.

* * * * *

UNITED STATES PATENT AND TRADEMARK OFFICE
CERTIFICATE OF CORRECTION

PATENT NO. : 6,977,966 B1
APPLICATION NO. : 09/723804
DATED : December 20, 2005
INVENTOR(S) : Muneer Zuhdi et al.

Page 1 of 1

It is certified that error appears in the above-identified patent and that said Letters Patent is hereby corrected as shown below:

<u>Column 6, Line 9:</u>
After "POTS (Plain" delete "**01*e*)" and insert -- Ole)** --.

Signed and Sealed this

Twentieth Day of November, 2007

JON W. DUDAS
*Director of the United States Patent and Trademark Office*